(12) United States Patent
Pliefke et al.

(10) Patent No.: US 11,555,888 B2
(45) Date of Patent: Jan. 17, 2023

(54) SYSTEM AND METHOD FOR CALIBRATING VEHICULAR RADAR SENSING SYSTEM

(71) Applicant: MAGNA ELECTRONICS INC., Auburn Hills, MI (US)

(72) Inventors: Sebastian Pliefke, Sailauf (DE); Jagmal Singh, Aschaffenburg (DE); Sergio D. Biarge, Munich (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 128 days.

(21) Appl. No.: 17/247,965

(22) Filed: Jan. 4, 2021

(65) Prior Publication Data

US 2021/0124015 A1    Apr. 29, 2021

Related U.S. Application Data

(63) Continuation of application No. 15/954,645, filed on Apr. 17, 2018, now Pat. No. 10,884,103.

(60) Provisional application No. 62/486,073, filed on Apr. 17, 2017.

(51) Int. Cl.
| | | |
|---|---|---|
| *G01S 7/40* | (2006.01) | |
| *G01S 13/931* | (2020.01) | |
| *G01S 13/42* | (2006.01) | |

(52) U.S. Cl.
CPC .............. *G01S 7/4026* (2013.01); *G01S 7/40* (2013.01); *G01S 7/4052* (2013.01); *G01S 13/42* (2013.01); *G01S 13/931* (2013.01); *G01S 7/403* (2021.05); *G01S 7/4034* (2021.05); *G01S 7/4086* (2021.05); *G01S 7/4095* (2021.05); *G01S 2013/93271* (2020.01)

(58) Field of Classification Search
None
See application file for complete search history.

(56) References Cited

U.S. PATENT DOCUMENTS

| | | | |
|---|---|---|---|
| 5,949,331 A | 9/1999 | Schofield et al. | |
| 6,437,731 B1 * | 8/2002 | Henrio ................. | G01S 7/4026 342/174 |
| 6,587,186 B2 | 7/2003 | Bamji et al. | |
| 6,674,895 B2 | 1/2004 | Rafii et al. | |
| | (Continued) | | |

FOREIGN PATENT DOCUMENTS

WO         2011090484 A1     7/2011

*Primary Examiner* — Whitney Moore
(74) *Attorney, Agent, or Firm* — Honigman LLP (57) ABSTRACT

A method for calibrating a vehicular radar sensing system includes disposing two spaced apart calibrating radars at respective transmitting locations that are spaced from a vehicle calibration location at an end of line portion of a vehicle assembly line, and moving a vehicle along the vehicle assembly line, the vehicle including an electronic control unit (ECU) and a vehicular radar operable to sense exterior of the vehicle. Signals are transmitted via the first and second calibrating radars at the transmitting locations and, with the vehicle at the vehicle calibration location, the plurality of radar receivers of the vehicular radar receive the transmitted signals transmitted by the first and second calibrating radars, and the vehicular radar generates an output that is processed at the ECU. Responsive to processing at the ECU of the output of the vehicular radar, misalignment of the vehicular radar at the vehicle is determined.

20 Claims, 7 Drawing Sheets

(56) References Cited

U.S. PATENT DOCUMENTS

| | | |
|---|---|---|
| 6,678,039 B2 | 1/2004 | Charbon |
| 6,690,354 B2 | 2/2004 | Sze |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 8,013,780 B2 | 9/2011 | Lynam |
| 8,027,029 B2 | 9/2011 | Lu et al. |
| 9,575,160 B1 | 2/2017 | Davis et al. |
| 10,884,103 B2 | 1/2021 | Pliefke et al. |
| 2010/0245066 A1 | 9/2010 | Sarioglu et al. |
| 2011/0285571 A1* | 11/2011 | Jeong .................. H01Q 1/3233 342/368 |
| 2013/0088382 A1* | 4/2013 | Lee ....................... G01S 7/4026 342/174 |
| 2016/0334511 A1* | 11/2016 | Ling ..................... G01S 13/931 |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0052223 A1* | 2/2018 | Stieff .................. G01B 11/026 |
| 2018/0203097 A1* | 7/2018 | Park ..................... G01S 7/4026 |
| 2018/0231635 A1 | 8/2018 | Woehlte |
| 2019/0339382 A1 | 11/2019 | Hess et al. |

\* cited by examiner

SYSTEM AND METHOD FOR CALIBRATING VEHICULAR RADAR SENSING SYSTEM

CROSS REFERENCE TO RELATED APPLICATIONS

The present application is a continuation of U.S. patent application Ser. No. 15/954,645, filed Apr. 17, 2018, now U.S. Pat. No. 10,884,103, which claims the filing benefits of U.S. provisional application Ser. No. 62/486,073, filed Apr. 17, 2017, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of imaging and radar sensors in vehicle imaging systems is common and known. Examples of such known systems are described in U.S. Pat. Nos. 8,013,780 and 5,949,331, and/or U.S. publication No. US-2010-0245066 and/or International Publication No. WO 2011/090484, which are hereby incorporated herein by reference in their entireties.

SUMMARY OF THE INVENTION

The present invention provides a system for calibrating radar sensors of a radar sensing system of a vehicle, such as part of a driver assistance system of the vehicle, which utilizes one or more radar sensors to sense regions exterior of the vehicle, with the radar sensor operable to transmit and receive signals, with the received signals processed to detect the presence of objects at or near the vehicle in the field of sensing of the sensor. The calibration system utilizes transmitters at fixed locations exterior and remote from the vehicle, such as at an end of line area of a vehicle assembly plant ahead of a location where a vehicle equipped with a radar sensing system may be positioned as the vehicle moves along the assembly line. The fixed transmitters transmit a signal code or signature recognized by the receivers of the vehicle radar system, and, based on the known location of the transmitters relative to the vehicle, the system can determine an offset of the vehicle radar sensors and calibrate the vehicle radar sensors accordingly.

These and other objects, advantages, purposes and features of the present invention will become apparent upon review of the following specification in conjunction with the drawings.

DESCRIPTION OF THE PREFERRED EMBODIMENTS

A vehicle sensing system and/or driver assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
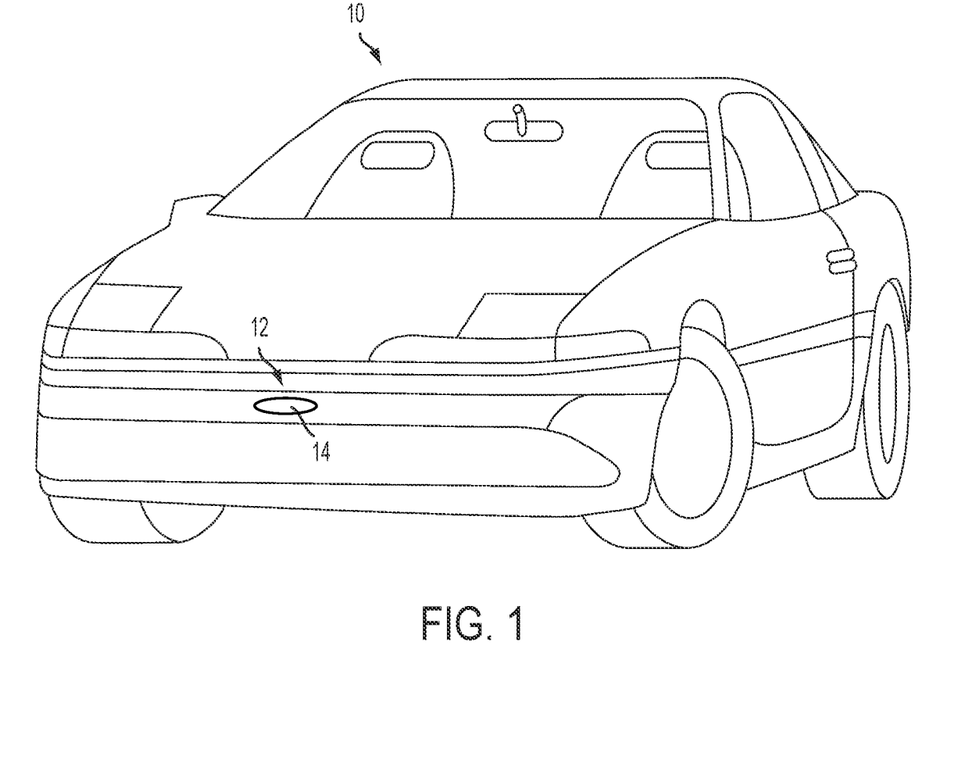
FIG. 1 is a perspective view of a vehicle with a sensing system that incorporates a radar sensor in accordance with the present invention.

Referring now to the drawings and the illustrative embodiments depicted therein, a vehicle 10 (FIG. 1) includes an driver assistance system or sensing system 12 that includes at least one radar sensor unit, such as a forward facing radar sensor unit 14 (and the system may optionally include multiple exterior facing sensors, such as cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor 88 (FIG. 8) that is operable to process data captured by the sensor or sensors and may detect objects or the like. The data transfer or signal communication from the sensor to the ECU may comprise any suitable data or communication link, such as a vehicle network bus or the like of the equipped vehicle.

The system includes one or more transmitter antennas 84 and one or more receiver antennas 86 (FIG. 8), which operate to transmit and receive signals and, via processing of received signals, may detect objects present in the field of sensing of the radar sensor and system. The system may use a plurality of radio frequency (RF) sensors, each of which provides a small form factor permitting placement in multiple locations on a vehicle to provide 360 degree sensing coverage for near range objects such as infrastructure, vehicles, bicycles and pedestrians. The RF sensor system supports functions such as parking aid, currently utilizing ultrasonic sensors, while addressing technical shortcomings of ultrasonic systems such as range, response time, short range detection, limited field of view, ability to accurately detect profiles of objects of interest, and the like.

Figure 2:
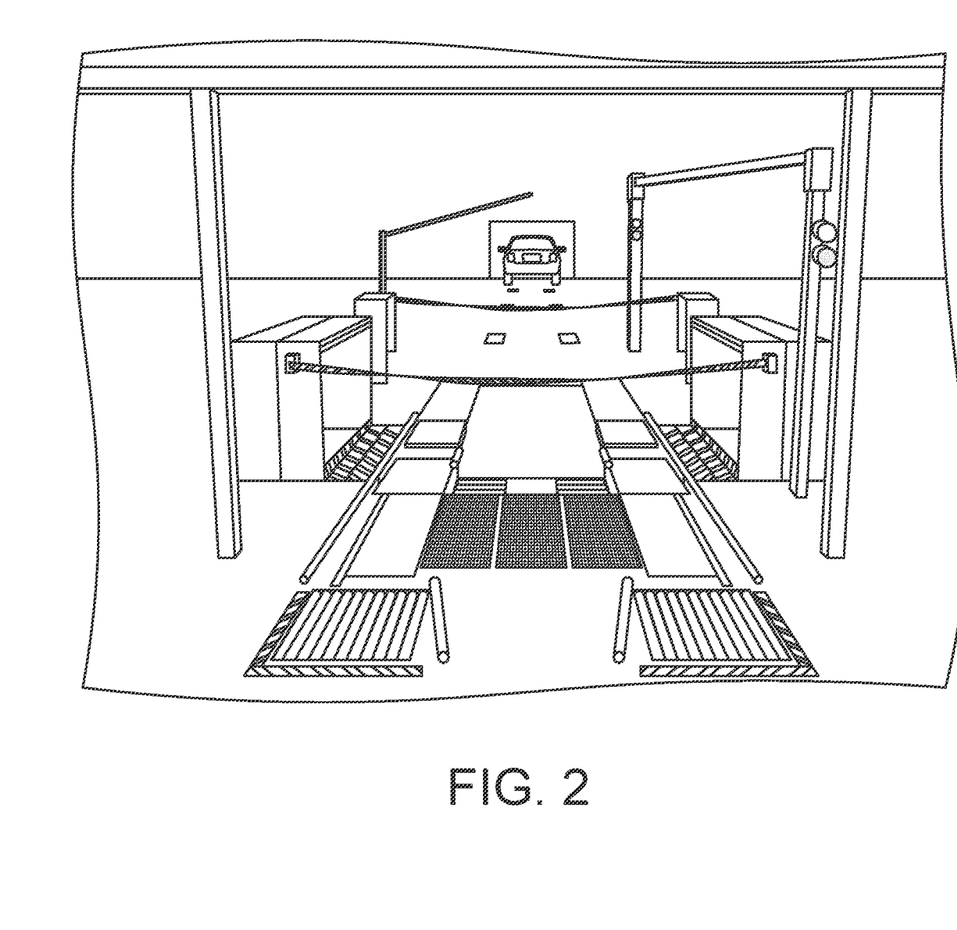
FIG. 2 is a perspective view of an end of line region of a vehicle assembly plant suitable for use of the calibration system.
Figure 3A:
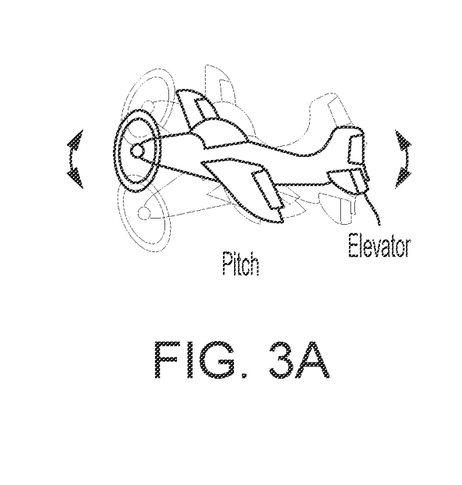
FIGS. 3A-C show examples of pitch, yaw and roll, which are ways in which the sensor may be misaligned at the vehicle.
Figure 3B:
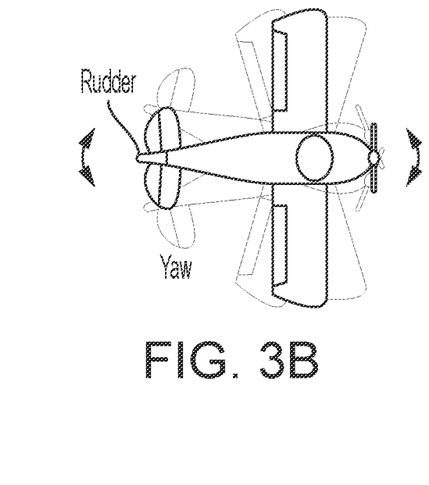
Figure 3C:
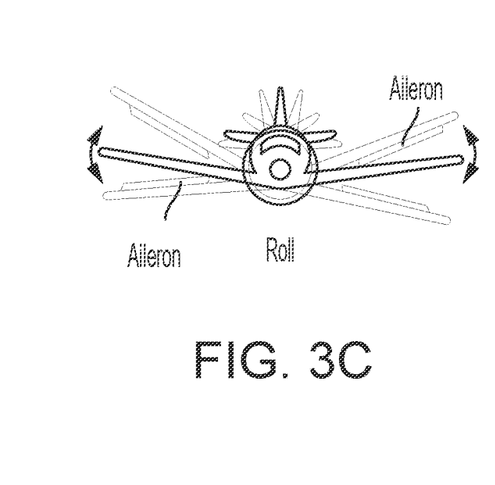

The system of the present invention is meant to carry out the external calibration of a radar sensor at a known location, such as at an End Of Line automotive production plant (see FIG. 2), or such as at a service station or the like. When installed on a vehicle during assembly, the radar sensor may be misaligned or mismounted, so as to be offset (due to mounting tolerances) when placed and rotated with respect to the desired positioning at the vehicle. The misalignment may be a rotational misalignment, which may be one or more of pitch, yaw and roll (see FIGS. 3A-C).

Figure 4:
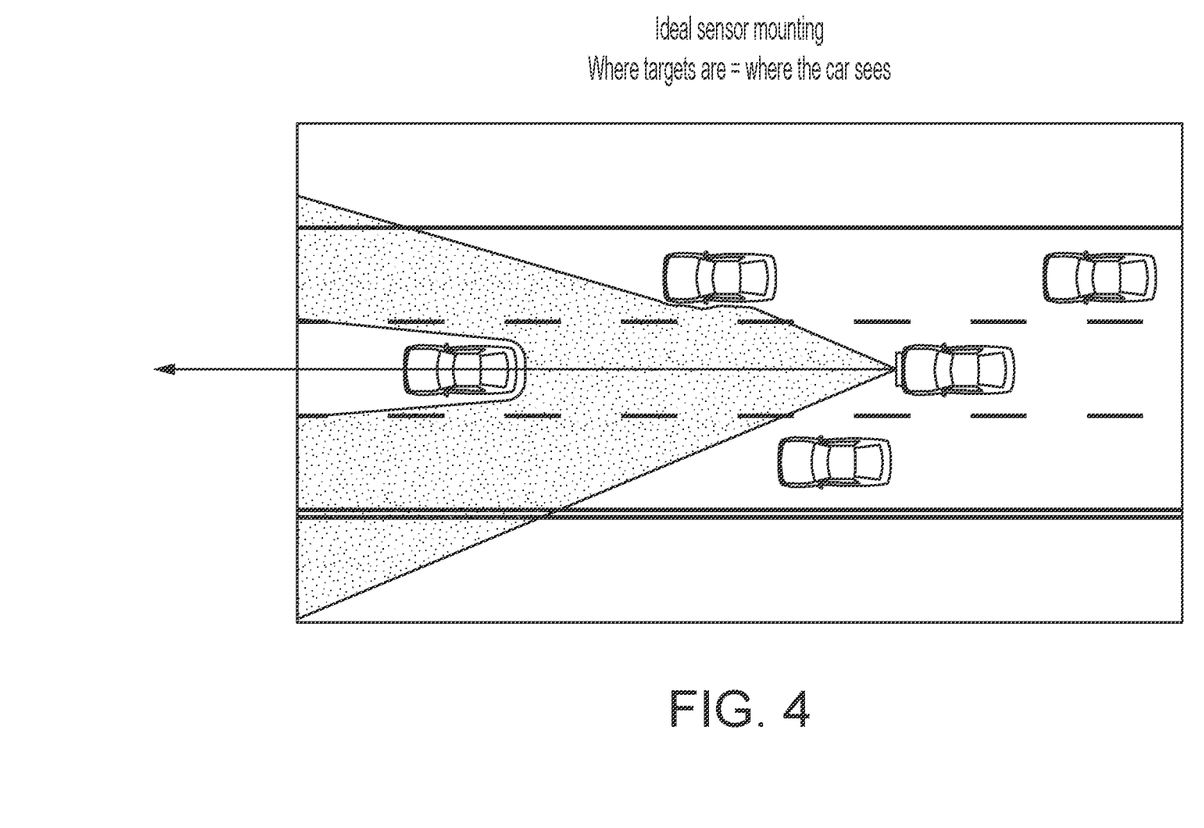
FIG. 4 is a schematic showing a field of sensing of a vehicle with a calibrated or aligned sensing system.
Figure 5:
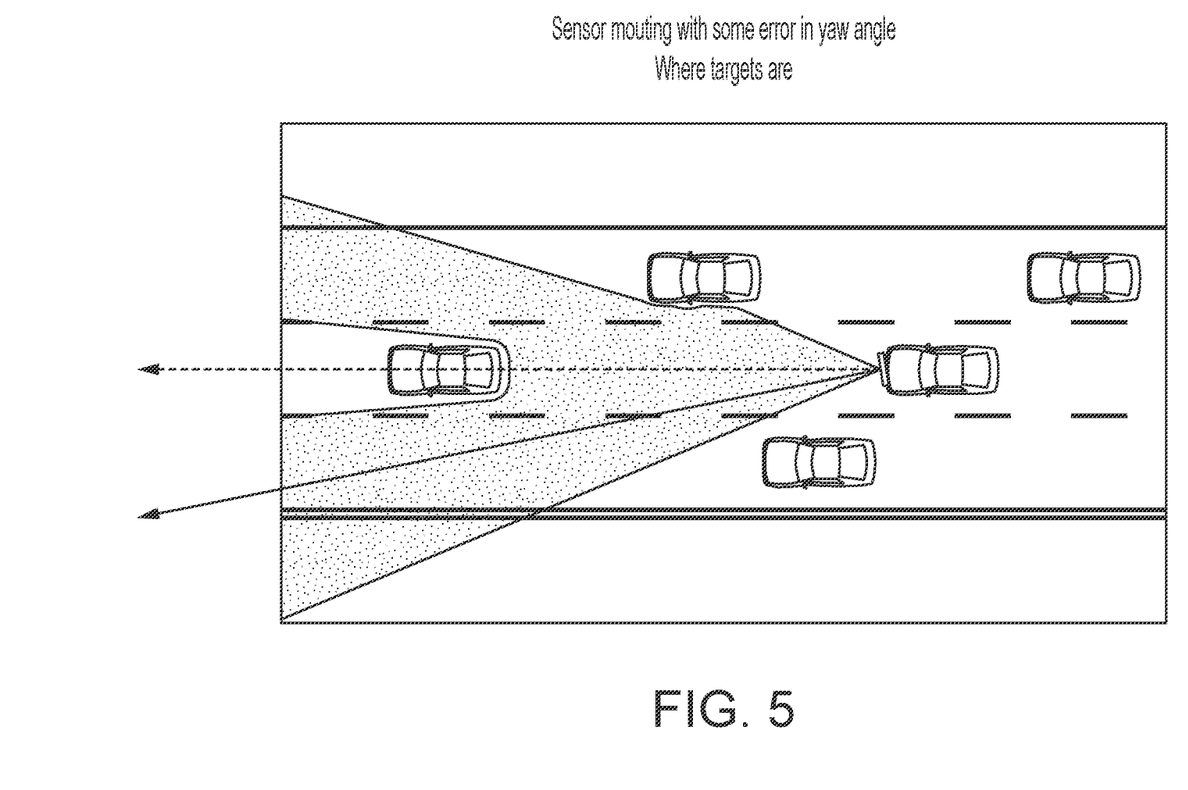
FIG. 5 is a schematic showing a misaligned sensor at the front of the vehicle.
Figure 6:
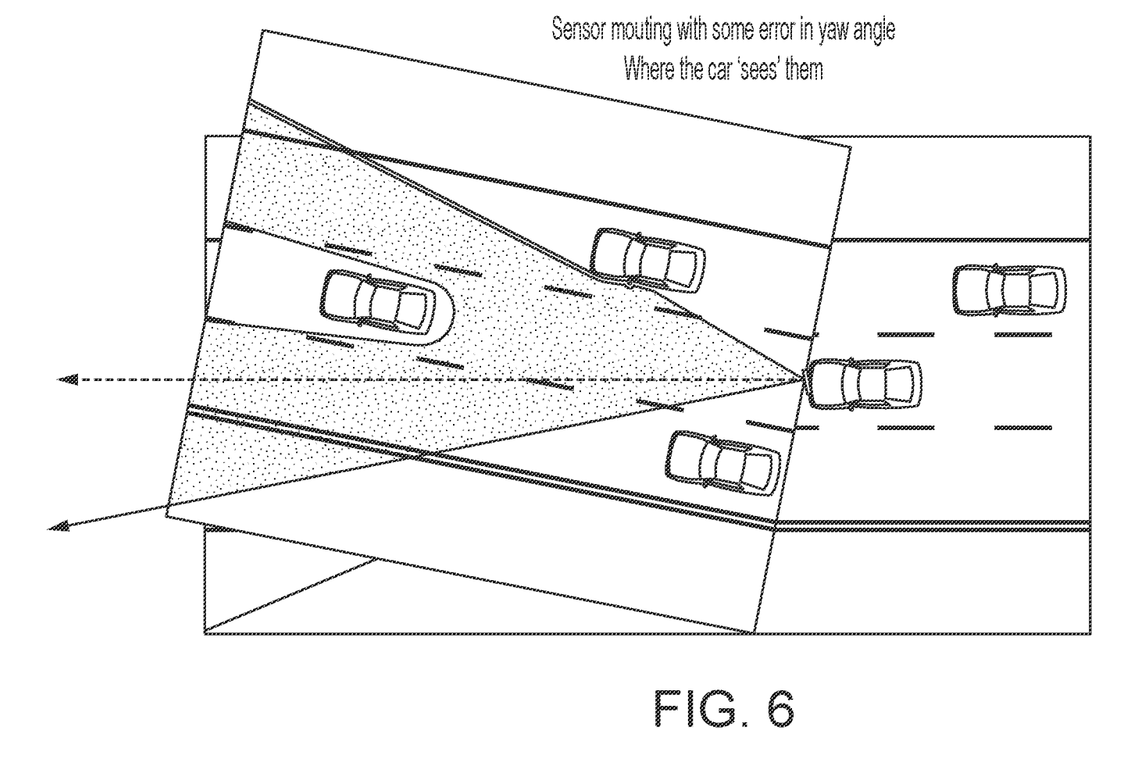
FIG. 6 is a schematic showing how the misaligned sensor may sense vehicles or objects ahead of the vehicle.
Figure 7:
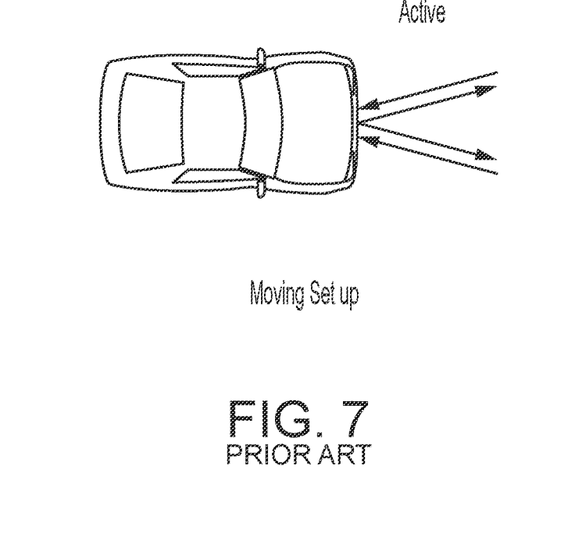
FIG. 7 shows how a known end of line calibration system may operate, using objects that are moved into and out of the field of sensing of the radar system of the non-moving vehicle.

Such misplacement or misalignment may result in a wrong target positioning of the targets. For example, with ideal sensor mounting, where the targets are located is where the system senses them to be (see FIG. 4). However, if the sensor is misaligned (such as having a mounting error in yaw angle as shown in FIG. 5), the misalignment results in the sensing system detecting objects or vehicles and determining that they are in positions different from where they actually are (see FIG. 6).

Current calibration of sensing systems (such as at an end of line calibration station) is performed with passive targets. The idea is to estimate the mounting rotation by comparing the measured position of the targets by the sensor and the ground truth. The targets are placed in the near range of the sensor, normally trying to shadow the rest of targets in the environment. The purpose of this is to avoid interference of other targets from the plant. The targets are placed at the desired or selected locations for the testing process and then removed after the calibration is completed (requiring a moving set up structure at the end of line of the assembly plant).

Such moving target calibration thus requires installation of a moving system in a production plant, which is inconvenient and requires additional time to set up and remove the targets. Also, the targets are placed close to the vehicle to avoid sensing of the wrong targets away from the vehicle. The rotation estimation using such close targets is very sensitive to the vehicle and target positioning inaccuracies. An error of only a few millimeters could yield an error of a few tenths of degrees or more, and the signal near field related problems may yield small angle accuracies. Such a system is not suitable for fulfilling strict requirements, and the moving platform cost could be relatively high.

The system of the present invention uses active radars 82 (FIG. 8) as calibration targets and the sensor at the vehicle can be calibrated in a passive mode (where the sensor is not transmitting, just 'listening' or receiving signals). The radar is responsive to or senses or recognizes a signal based on a code. This can be exploited by setting a set of calibration codes that every sensor knows. In this way, the sensor to-be-calibrated can easily identify and receive the transmitted signals and can thus easily identify the targets with no other target interference. Thus, the calibration active radars can be placed away of the near field and can be permanently or fixedly installed at such locations where they are not intruding the end of line region. Thus, the rotation or misalignment of the sensors can be estimated much more accurately.

The system of the present invention thus provides calibration of the sensors without any need for a moving platform for the proposed set up. The vehicle may be directly driven or conveyed through once the calibration is finished. Other targets cannot interfere with the calibration active targets. The calibration targets can be placed far away from the vehicle and end of line region. Thus, the method is insensitive to vehicle and target positioning errors. The system thus provides enhanced rotation estimation accuracy that allows the system to fulfill high accuracy requirements. The transmitting sensor or sensors may achieve significantly reduced costs as compared to the passive object set up. The transmitting sensor or sensors may be disposed anywhere at or near or along the vehicle assembly line, preferably at the end of line region where the vehicle is fully assembled and undergoing testing of various systems. Optionally, the transmitting sensor or sensors may be disposed at any location at a service station or the like for calibrating sensors and sensing systems after equipped vehicles are driven on the road and after the sensors may become misaligned.

Figure 8:
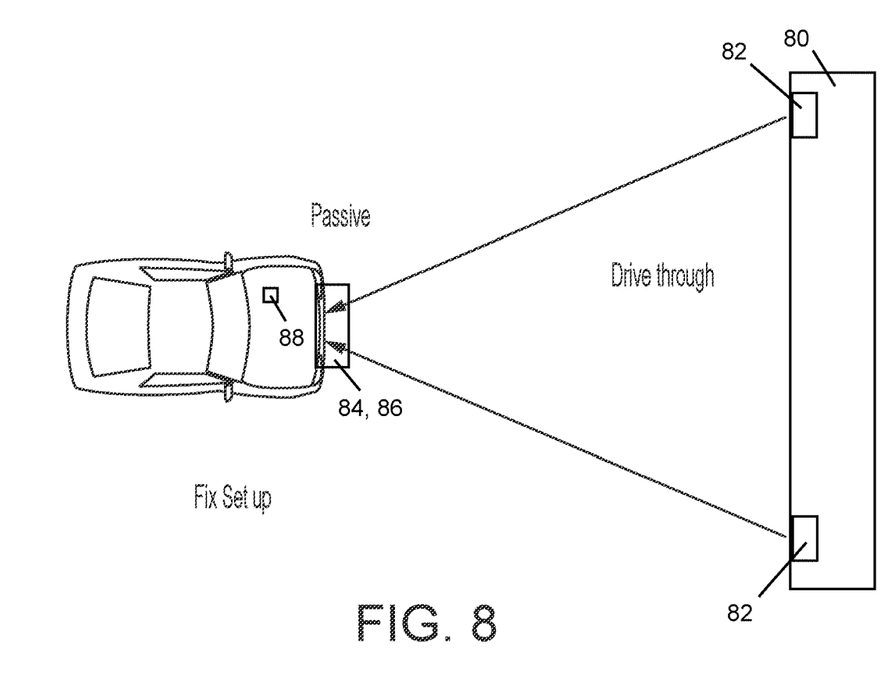
FIG. 8 shows how the end of line calibration system of the present invention may operate, receiving signals from fixed transmitters disposed at the end of line region of the vehicle assembly plant as the vehicle is moved along the assembly line.

Upon determination of a misalignment, the system may calibrate the sensors or sensing system according to the determined degree of misalignment. For example, and with reference to FIG. 6, if the calibration process determines that the sensors are misaligned to the left, the system may adjust processing of the sensor data or sensed signals to shift the sensing field to the right an appropriate amount so as to virtually or effectively adjust the sensing system to accommodate the determined misalignment. FIG. 8 shows how the end of line calibration system of the present invention may operate, receiving signals from fixed calibrating radar transmitters 82 disposed at the end of line region 80 of the vehicle assembly plant (or other transmitting location such as a test location or a vehicle service station), as the vehicle is moved along the assembly line. As discussed above, the vehicle includes the radar sensor 14 having a plurality of radar transmitters 84 that transmit radio signals and a plurality of receivers 86 that receive radio signals. The processor 88 processes an output of the receivers of the radar sensor. With the vehicle at a vehicle calibration location, the calibrating transmitters transmit signals from the transmitting location that are received by the receivers of the radar sensor at the vehicle calibration location. Responsive to processing by the processor of the output of the receivers when receiving signals transmitted by the calibrating transmitter, the calibration system determines if the radar sensor is misaligned at the vehicle.

The sensing system may utilize aspects of the systems described in U.S. Pat. Nos. 9,575,160; 8,027,029; 8,013, 780; 6,825,455; 7,053,357; 7,408,627; 7,405,812; 7,379, 163; 7,379,100; 7,375,803; 7,352,454; 7,340,077; 7,321, 111; 7,310,431; 7,283,213; 7,212,663; 7,203,356; 7,176, 438; 7,157,685; 6,919,549; 6,906,793; 6,876,775; 6,710, 770; 6,690,354; 6,678,039; 6,674,895 and/or 6,587,186, and/or International Publication Nos. WO 2018/007995 and/ or WO 2011/090484 and/or U.S. Publication Nos. US-2018- 0045812; US-2018-0015875; US-2017-0356994; US-2017- 0315231; US-2017-0276788; US-2017-0254873; US-2017- 0222311 and/or US-2010-0245066, and/or U.S. patent application Ser. No. 15/897,268, filed Feb. 15, 2018 and published Aug. 16, 2018 as U.S. Publication No. US-2018- 0231635, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for calibrating a vehicular radar sensing system, the method comprising:

disposing two spaced apart calibrating radars at respective transmitting locations that are spaced from a vehicle calibration location at an end of line portion of a vehicle assembly line, wherein the at least two spaced apart calibrating radars comprise (i) a first calibrating radar at a first known location relative to the end of line portion of the vehicle assembly line and (ii) a second calibrating radar at a second known location relative to the end of line portion of the vehicle assembly line;

moving a vehicle along the vehicle assembly line, wherein the vehicle includes a vehicular radar disposed at the vehicle and operable to sense exterior of the vehicle, and wherein the vehicular radar comprises a plurality of radar transmitters operable to transmit radio signals and a plurality of radar receivers operable to receive radio signals;

providing an electronic control unit (ECU) at the vehicle, the ECU comprising a processor operable to process outputs of the vehicular radar;

transmitting signals via the first and second calibrating radars at the transmitting locations;

moving the vehicle along the vehicle assembly line to the vehicle calibration location at the end of line portion of the vehicle assembly line;

with the vehicle at the vehicle calibration location, receiving, via the plurality of radar receivers of the vehicular radar disposed at the vehicle, the transmitted signals transmitted by the first and second calibrating radars;

responsive to the plurality of radar receivers receiving the transmitted signals transmitted by the first and second calibrating radars, generating an output via the vehicular radar;

processing at the ECU the output of the vehicular radar; and responsive to processing at the ECU of the output of the vehicular radar, determining misalignment of the vehicular radar at the vehicle.

2. The method of claim 1, wherein determining misalignment of the vehicular radar at the vehicle comprises determining rotational misalignment of the vehicular radar at the vehicle.

3. The method of claim 1, wherein, at least when the vehicle is at the vehicle calibration location, the vehicular radar is operated in a passive mode, and wherein the plurality of radar transmitters of the vehicular radar do not transmit radio signals when the vehicular radar is operating in the passive mode.

4. The method of claim 1, wherein the first and second calibrating radars are positioned at the respective transmitting locations such that the first and second calibrating radars are at opposite sides of a projected path of travel of the vehicle when the vehicle is at the vehicle calibration location.

5. The method of claim 1, wherein the vehicle is moved along a straight path at the vehicle calibration location relative to the first and second calibrating radars disposed at the transmitting locations.

6. The method of claim 1, wherein determining misalignment of the vehicular radar comprises determining misalignment of the vehicular radar at the vehicle based on a known position of the vehicle at the vehicle calibration location relative to the first and second known locations of the first and second calibrating radars at the transmitting locations.

7. The method of claim 1, wherein the first and second calibrating radars each transmits a coded signal, and wherein, via processing at the ECU of the output of the vehicular radar, the ECU recognizes the coded signal for calibration of the vehicular radar.

8. The method of claim 7, wherein the coded signal transmitted by the first and second calibrating radars is different from the radio signals transmitted by the plurality of radar transmitters of the vehicular radar, and wherein the ECU recognizes the coded signal received by the plurality of radar receivers of the vehicular radar when the plurality of radar receivers of the vehicular radar are also receiving the radio signals transmitted by the plurality of radar transmitters and reflected from an object.

9. The method of claim 1, wherein determining misalignment of the vehicular radar at the vehicle comprises determining misalignment of the vehicular radar at the vehicle without use of targets at the vehicle calibration location.

10. A method for calibrating a vehicular radar sensing system, the method comprising:

disposing two spaced apart calibrating radars at respective transmitting locations that are spaced from a vehicle calibration location at an end of line portion of a vehicle assembly line, wherein the at least two spaced apart calibrating radars comprise (i) a first calibrating radar at a first known location relative to the end of line portion of the vehicle assembly line and (ii) a second calibrating radar at a second known location relative to the end of line portion of the vehicle assembly line;

moving a vehicle along the vehicle assembly line, wherein the vehicle includes a vehicular radar disposed at the vehicle and operable to sense exterior of the vehicle, and wherein the vehicular radar comprises a plurality of radar transmitters operable to transmit radio signals and a plurality of radar receivers operable to receive radio signals;

providing an electronic control unit (ECU) at the vehicle, the ECU comprising a processor operable to process outputs of the vehicular radar;

transmitting signals via the first and second calibrating radars at the transmitting locations;

moving the vehicle along the vehicle assembly line to the vehicle calibration location at the end of line portion of the vehicle assembly line;

wherein, at least when the vehicle is at the vehicle calibration location, the vehicular radar is operated in a passive mode, and wherein the plurality of radar transmitters of the vehicular radar do not transmit radio signals when the vehicular radar is operating in the passive mode;

with the vehicle at the vehicle calibration location, receiving, via the plurality of radar receivers of the vehicular radar disposed at the vehicle, the transmitted signals transmitted by the first and second calibrating radars;

responsive to the plurality of radar receivers receiving the transmitted signals transmitted by the first and second calibrating radars, generating an output via the vehicular radar;

processing at the ECU the output of the vehicular radar; and responsive to processing at the ECU of the output of the vehicular radar, determining rotational misalignment of the vehicular radar at the vehicle.

11. The method of claim 10, wherein the first and second calibrating radars are positioned at the respective transmitting locations such that the first and second calibrating radars are at opposite sides of a projected path of travel of the vehicle when the vehicle is at the vehicle calibration location.

12. The method of claim 10, wherein the vehicle is moved along a straight path at the vehicle calibration location relative to the first and second calibrating radars disposed at the transmitting locations.

13. The method of claim 10, wherein determining rotational misalignment of the vehicular radar comprises determining rotational misalignment of the vehicular radar at the vehicle based on a known position of the vehicle at the vehicle calibration location relative to the first and second known locations of the first and second calibrating radars at the transmitting locations.

14. The method of claim 10, wherein the first and second calibrating radars each transmits a coded signal, and wherein, via processing at the ECU of the output of the vehicular radar, the ECU recognizes the coded signal for calibration of the vehicular radar.

15. A method for calibrating a vehicular radar sensing system, the method comprising:

disposing two spaced apart calibrating radars at respective transmitting locations that are spaced from a vehicle calibration location at an end of line portion of a vehicle assembly line, wherein the at least two spaced apart calibrating radars comprise (i) a first calibrating radar at a first known location relative to the end of line portion of the vehicle assembly line and (ii) a second calibrating radar at a second known location relative to the end of line portion of the vehicle assembly line, and wherein the first and second known locations are at opposite sides of a projected path of travel of a vehicle when the vehicle is at the vehicle calibration location;

moving the vehicle along the vehicle assembly line, wherein the vehicle includes a vehicular radar disposed at the vehicle and operable to sense exterior of the vehicle, and wherein the vehicular radar comprises a plurality of radar transmitters operable to transmit radio signals and a plurality of radar receivers operable to receive radio signals;

providing an electronic control unit (ECU) at the vehicle, the ECU comprising a processor operable to process outputs of the vehicular radar;

transmitting signals via the first and second calibrating radars at the transmitting locations;

moving the vehicle along the vehicle assembly line to the vehicle calibration location at the end of line portion of the vehicle assembly line;

with the vehicle at the vehicle calibration location, receiving, via the plurality of radar receivers of the vehicular radar disposed at the vehicle, the transmitted signals transmitted by the first and second calibrating radars;

responsive to the plurality of radar receivers receiving the transmitted signals transmitted by the first and second calibrating radars, generating an output via the vehicular radar;

processing at the ECU the output of the vehicular radar; and responsive to processing at the ECU of the output of the vehicular radar, determining rotational misalignment of the vehicular radar at the vehicle.

16. The method of claim 15, wherein, at least when the vehicle is at the vehicle calibration location, the vehicular radar is operated in a passive mode, and wherein the plurality of radar transmitters of the vehicular radar do not transmit radio signals when the vehicular radar is operating in the passive mode.

17. The method of claim 15, wherein the vehicle is moved along a straight path at the vehicle calibration location relative to the first and second calibrating radars disposed at the transmitting locations.

18. The method of claim 15, wherein determining rotational misalignment of the vehicular radar comprises determining rotational misalignment of the vehicular radar at the vehicle based on a known position of the vehicle at the vehicle calibration location relative to the first and second known locations of the first and second calibrating radars at the transmitting locations.

19. The method of claim 15, wherein the first and second calibrating radars each transmits a coded signal, and wherein, via processing at the ECU of the output of the vehicular radar, the ECU recognizes the coded signal for calibration of the vehicular radar.

20. The method of claim 19, wherein the coded signal transmitted by the first and second calibrating radars is different from the radio signals transmitted by the plurality of radar transmitters of the vehicular radar, and wherein the ECU recognizes the coded signal received by the plurality of radar receivers of the vehicular radar when the plurality of radar receivers of the vehicular radar are also receiving the radio signals transmitted by the plurality of radar transmitters and reflected from an object.

\* \* \* \* \*